(12) United States Patent
Nordeng et al.

(10) Patent No.: US 11,186,689 B2
(45) Date of Patent: Nov. 30, 2021

(54) METHOD TO DISPERSE NANO-CELLULOSE IN ORGANIC POLYMER PRECURSORS

(71) Applicant: NORSKE SKOG SAUGBRUGS AS, Halden (NO)

(72) Inventors: Mikael Nordeng, Oslo (NO); Stein Dietrichson, Fredrikstad (NO); Joachim Karthäuser, Sundbyberg (SE)

(73) Assignee: NORSKE SKOG SAUGBRUGS AS, Halden (NO)

( * ) Notice: Subject to any disclaimer, the term of this patent is extended or adjusted under 35 U.S.C. 154(b) by 104 days.

(21) Appl. No.: 16/538,877

(22) Filed: Aug. 13, 2019

(65) Prior Publication Data

US 2019/0359779 A1 Nov. 28, 2019

Related U.S. Application Data

(63) Continuation of application No. PCT/EP2018/053587, filed on Feb. 13, 2018.

(30) Foreign Application Priority Data

Feb. 13, 2017 (SE) .................................. 1700027-4

(51) Int. Cl.

| | |
|---|---|
| *C08J 3/205* | (2006.01) |
| *C08K 3/04* | (2006.01) |
| *C08J 3/09* | (2006.01) |
| *C08L 1/02* | (2006.01) |
| *C08L 63/00* | (2006.01) |
| *C08L 75/04* | (2006.01) |
| *C08L 1/00* | (2006.01) |
| *C08J 5/00* | (2006.01) |
| *C08J 3/20* | (2006.01) |
| *C08J 3/24* | (2006.01) |

(52) U.S. Cl.
CPC .............. *C08J 3/2053* (2013.01); *C08J 3/09* (2013.01); *C08J 3/20* (2013.01); *C08J 3/205* (2013.01); *C08J 3/24* (2013.01); *C08J 5/005* (2013.01); *C08K 3/041* (2017.05); *C08L 1/00* (2013.01); *C08L 1/02* (2013.01); *C08L 63/00* (2013.01); *C08L 75/04* (2013.01); *C08J 2301/00* (2013.01); *C08J 2363/00* (2013.01); *C08J 2375/00* (2013.01); *C08J 2375/04* (2013.01); *C08J 2401/02* (2013.01)

(58) Field of Classification Search
CPC ... C08J 3/2053; C08J 3/09; C08J 5/005; C08J 3/20; C08J 3/205; C08J 3/24; C08J 2363/00; C08J 2375/04; C08J 2401/02; C08J 2301/00; C08J 2375/00; C08K 3/041; C08L 1/02; C08L 63/00; C08L 75/04; C08L 1/00
See application file for complete search history.

(56) References Cited

U.S. PATENT DOCUMENTS

| | | | |
|---|---|---|---|
| 9,376,503 | B2 | 6/2016 | Shoseyov et al. |
| 2016/0115359 | A1 | 4/2016 | Siqun et al. |

FOREIGN PATENT DOCUMENTS

| | | |
|---|---|---|
| CA | 2549844 A1 | 11/2007 |
| WO | 2010007163 A1 | 1/2010 |
| WO | 2014087053 A1 | 6/2014 |

*Primary Examiner* — Patrick D Niland
(74) *Attorney, Agent, or Firm* — Wenderoth, Lind & Ponack, L.L.P.

(57) ABSTRACT

This invention concerns a novel method to produce thermosets such as epoxies and polyurethanes comprising nano-cellulose. The method comprises contacting primarily water-bourne dispersed nano-cellulose with liquid thermoset precursors, specifically epoxy or amine in the case of epoxies, or glycols or similar in the case of polyurethanes. Nano-cellulose transfers to the organic phase, and water is removed at temperatures below 100° C. Thereafter the organic phase comprising nano-cellulose can be mixed with the reactive counterpart to yield nano-composites with improved properties. The products can be used for composite articles, coatings, adhesives, sealants, and other end-uses. Preferred embodiments are described in detail.

12 Claims, No Drawings

METHOD TO DISPERSE NANO-CELLULOSE IN ORGANIC POLYMER PRECURSORS

This application is the continuation of International Application No. PCT/EP2018/053587, filed 13 Feb. 2018, which claims the benefit of Swedish Patent Application No. SE 1700027-4, filed 13 Feb. 2017, the entire contents of which are hereby incorporated by reference.

FIELD OF THE INVENTION

The present invention relates to nano-cellulose, its dispersion in polymers and polymer precursors including epoxy and polyurethane (all in the following abbreviated as "polymers" or "polymer"), and derived products such as nano-composites, adhesives, sealants, coatings.

BACKGROUND OF THE INVENTION

Various disclosures describe the dispersion of nano-cellulose in polymer and polymer precursors and products derived from this.

EP2928957A1, also WO 2014/087 053, METHOD OF MANUFACTURING A NANOCELLULOSE COMPOSITE, (Kalle Nättinen, VTT Finland, publ. 2015) describes the disadvantages and problems of prior art attempts of dispersing nano-cellulose in thermoset precursors, including: a) the necessarily high water content of nano-cellulose feedstock which in turn means a high energy demand for water removal, high transport costs etc., b) the formation of crystalline segments requiring expensive filtration and removal, alternatively re-dispersion using inefficient ultrasound, and other practical problems. Said disclosure teaches the direct formation of and dispersion of pure nano-cellulose in thermoset precursors such as epoxy or hardener using efficient milling equipment. The complete process from standard cellulose to nano-composites comprising nano-cellulose is thus possible without intermediate use of water.

CA2549844A1, SOLID PHASE DISPERSION AND PROCESSING OF MICRO-AND NANO-CELLULOSIC FIBRES IN PLASTIC PHASE TO MANUFACTURE BIO-NANOCOMPOSITE PRODUCTS OF COMMERCIAL INTEREST (Sain Mohini M., publ 2014) discloses bio-nano-composite products using solid phase dispersion. The mechanical performance of the cellulose nanofibers is comparable to other engineering materials such as glass fibers, carbon fibers etc. In this invention a novel process for dispersion of plant stems (bundles of cellulose nanofibers with a diameter ranging between 10 to 70 nm and lengths of thousands of nanometers) has been developed to disperse cellulosic microfibres and nanofibres in solid phase into a molten plastic matrix or in a low viscosity water-based resin system in aqueous phase. The invention relates to manufacturing Bio-nanocomposites of high performance by dispersing micro- and nano-cellulosic fibres into plastic matrix using conventional plastic processing equipment. This invention also overcomes one unique challenge of bio-nanocomposite processing, which is to make them commercially viable by surface modifying cellulosic micro- and nano-fibres derived from renewable resources.

US20160115359A1, WOOD ADHESIVES CONTAINING REINFORCED ADDITIVES FOR STRUCTURAL ENGINEERING PRODUCTS (Wang, Siqun, Univ. of Tennessee, publ. 2016) describes wood adhesives possibly including nano-cellulose, however, the disclosure is silent about special dispersion methods.

Not directly relevant, but interesting prior art includes U.S. Pat. No. 9,376,503, Cellulose-based composite materials (Shoseyov, Oded, publ 2016), which discloses a composite article, comprising a scaffold arranged in substantially ordered nanosheets and having a plurality of pores, the scaffold comprising at least one cellulose nano-material selected from the group consisting of . . . cellulose; and at least one polymer resin at least partially occupying a plurality of pores in the scaffold.

OBJECT OF THE INVENTION

The object of the invention is to produce thermosets comprising nano-cellulose.

A further object of the invention is to provide thermosets comprising well dispersed nano-cellulose.

A further object of the invention is to provide thermosets with improved properties such as increased impact resistance, increased tensile strength, and improved adhesion to various substrates.

A further object of the invention is to provide a method of preparing thermosets which is energy-efficient, economic and scalable.

A further object of the invention is to use the thermosets as composite articles, coatings, adhesives, sealants, and other end-uses.

SUMMARY OF THE INVENTION

The objects of the invention are attained by the method to produce thermosets including epoxies and polyurethanes.

In a preferred embodiment of the invention, the method to produce thermosets including epoxies and polyurethanes comprising 0.1-10% by weight nano-cellulose, comprises the following steps:

a) nano-cellulose is provided as water-bourne dispersion, optionally containing up to 50% ethanol, whereby said dispersion comprises at least 0.2%, preferably at least 0.3%, most preferably about 2-5% by weight nano-cellulose, b) said nano-cellulose is intensively mixed with an organic phase, specifically a thermoset precursor selected from epoxy, epoxy hardener, glycol and/or polyol, c) upon transfer of nano-cellulose to the organic phase, water and said optional ethanol are removed by distillation at a temperature below 100° C. for minimising loss of reactive functionality of epoxy or polyurethane, d) the dry organic phase comprising nano-cellulose is mixed with the appropriate amount of reactive counterpart and optionally other desired additives, wherein said reactive counterpart is amine hardener for epoxies, and wherein said reactive counterpart is glycol or amine for polyisocyanate, and e) the final product is achieved following known curing procedures, said method further characterized by the fact that loss of reactive functionality of epoxy or polyurethane due to reaction with water is limited to <50% of reactive epoxy or polyurethane, preferably <20% or <10% or <5% of reactive epoxy or polyurethane.

In a further preferred embodiment of the method, said distillation is by speed distillation, preferably high-speed distillation.

In a further preferred embodiment of the method, said distillation is by using a rotary evaporator and/or wiped film evaporator.

In a further preferred embodiment of the method, said distillation is by using a rotary evaporator.

In a further preferred embodiment of the method, said distillation is by using a wiped film evaporator.

In a further preferred embodiment of the method, said distillation is by using an extruder, including a planetary extruder with possibility for gas removal.

In a further preferred embodiment of the method, said nanocellulose is microfibrillar cellulose (MFC) and/or nanocrystalline cellulose (NCC).

In a further preferred embodiment of the method, said nanocellulose is selected from and shall be understood as cellulosic fibres, in particular cellulosic fibres obtained by defibering of lignocellulosic raw-material, optionally bleached, with typical fiber lengths of 10 nanometer up to 100 micrometer, also comprising nanocrystalline cellulose (NCC) and microfibrillar cellulose (MFC).

In a further preferred embodiment of the method, said epoxy compounds are selected from organic compounds carrying at least two epoxy functionalities, including bisphenol A adducts with epichlorohydrin.

In a further preferred embodiment of the method, the residual water content in the polymer (e.g. epoxy)/cellulose mixture is reduced to below 10% by weight, preferably to below 3% and even more preferably to below 1% by treatment in a rotary evaporator, in a wiped-film-evaporator or in an extruder with possibility for gas removal, ideally under a pressure below 1 bar.

In a further preferred embodiment of the method, carbon nano tubes (CNT) are part of the composition, and where CNT may be dispersed e.g. by ultrasound separately in water and mixed thereafter with water/cellulose, or where CNT are dispersed in presence of cellulose, and where the final content of CNT in finished products may range from 0.1% by weight to 10% by weight, In a further preferred embodiment of the method, the loss of reactive functionality of epoxy or polyurethane due to reaction with water is compensated by adjusting the hardener reaction during curing, or by adding additional epoxy or diisocyanate to ensure complete cross-linking, including reaction of e.g. diols formed by reaction of epoxy and water.

The objects of the invention are also attained by a composition produced according to the above mentioned preferred embodiments of the method.

In a preferred embodiment, the composition comprises nano-cellulose and polymer selected from epoxy, epoxy hardener or polyurethane hardener such as glycol, optionally containing carbon nano tubes and other functional additives including defoamers, pigments, antioxidants, viscosity adjusting chemicals and resins for adhesives.

The objects of the invention are also attained by an article such as a composite article, a coating, an adhesive or a sealant based on the above mentioned preferred embodiments of the composition.

The objects of the invention are also attained by use of a composition according the above mentioned preferred embodiment of the composition as a composite article, a coating, an adhesive or a sealant.

DETAILED DESCRIPTION

In one aspect, the invention describes improved methods to produce thermosets including epoxies and polyurethanes comprising 0.1-10% by weight nano-cellulose, comprising the following steps:

a) nano-cellulose is provided as water-bourne dispersion, optionally containing up to 50% ethanol, whereby said dispersion comprises 0.2-10% by weight, preferably 0.3-5% nano-cellulose, b) said nano-cellulose is intensively mixed with an organic phase, specifically a thermoset precursor selected from epoxy, epoxy hardener, glycol and/or polyol, c) upon transfer of nano-cellulose to the organic phase, water is removed by distillation at a temperature below 100° C., d) the dry organic phase comprising nano-cellulose is mixed with the appropriate amount of reactive counterpart (epoxy—amine hardener; polyisocyanate—glycol or amine) and optionally other desired additives, e) the final product is achieved following known curing procedures.

In another aspect of the invention, the function of various additives such as carbon nano tubes (CNT) for imparting e.g. electrical conductivity or microwave absorbancy, additional epoxy to guarantee cross-linking of side reaction products such as diols from the reaction of epoxy with water, and other additives is disclosed.

In comparison to prior art, the invention succeeds in providing thermosets comprising well dispersed nano-cellulose with improved properties such as increased impact resistance, increased tensile strength, and improved adhesion to various substrates. The methods disclosed are energy-efficient, economic and scalable.

In the present invention, nano-cellulose shall be understood as cellulosic fibres, in particular cellulosic fibres obtained by defibering of lignocellulosic raw-material, optionally bleached, with typical fiber lengths of 10 nanometer up to 100 micrometer, also comprising nanocrystalline cellulose (NCC) and microfibrillar cellulose (MFC).

In the present invention, epoxy is defined as a raw material for epoxy composites, typically comprising bisphenol-A, bisphenol-F and related di- or polyfunctional compounds comprising epoxy groups (—CH2-COH2-) where the oxygen atom O and the two carbon atoms C form a reactive ring structure, said epoxy typically reacted with amines or other hardeners to crosslinked thermosets.

EXAMPLES

Methods and compositions and finished products are described in the following section. Those are useful for the production of goods such as composites, coatings, adhesives and sealants.

Example 1

Low molecular weight epoxy types (bis A/F) such as epikote 235 were used in example 1. These are reaction products of CAS: 25068-38-6 NLP: 500-033-5 reg. nr.: 01-2119456619-26-0006, bisfenol-A and epichlorohydrin 50-100%, CAS: 9003-36-5 NLP: 500-006-8, reg nr: 01-2119454392-40-0003, Formaldehyde, oligomeric reaction products with 1-chloro-2,3-epoxypropane and phenol 25-50%, Viscosity: 6-8000 mPas, epoxy equivalent 175-185.

Epoxy and MFC were mixed and dispersed for 30 min at 3000 rpm using a Dispermill Yellow-Line dissolver. Residual water was removed by a) heating the mixture overnight in an oven at ca. 80° C., b) by using a rotary evaporator, with vacuum at 40° C., c) by using a wiped film evaporator under vacuum, d) by using an extruder with gas outlets for water removal. Reference samples were prepared by mixing with water without nano- or microfibrillar cellulose.

The reaction of epoxy with water yielding a diol is the most significant loss reaction. The reaction of epoxy with OH groups in cellulose was found to be slow. It turned out that wiped film evaporation and extrusion with gas removal are efficient at minimizing the side reaction(s). Reduced effective epoxy content can be compensated in two ways, a) reducing the hardener amount by 2-20% to afford complete reaction between epoxy and (amine) hardener, b) adding additional epoxy to afford reaction between diols and excess epoxy. The latter method results in stronger composites.

The final water content can approach zero, but for practical purposes about 1% water by weight or up to 3% is acceptable for most products.

Example 2

NFC and MFC were dispersed in water-soluble amines, partly water-soluble amines, amides as well as glycols as precursors for polyurethanes. It was not attempted to disperse cellulose in isocyanates as these chemicals react too fast with water. Curing of epoxy or diisocyanate with above mentioned hardener/cellulose mixtures proceeds as without cellulose addition, however, for water-soluble amines a shortened hardening time or pot life was observed.

Example 3

Carbon nano tubes (CNT) were dispersed in water using ultrasound using known procedures. Dispersed CNT were added to nano-cellulose in water, and the mixture was further dispersed in order to afford complexes of CNT and nano-cellulose. (CNT can also directly be treated with ultrasound in the cellulose-water mixture, however, the cellulose is exposed to high temperatures in that case.) Mixing said CNT/cellulose blend with epoxy results in a faster phase transfer of CNT/cellulose into epoxy compared with the phase transfer rate of pure cellulose. This is possibly due to the increased hydrophobicity of the CNT/cellulose complex. Following the general procedure outlined in example 1, products result characterized by increased electrical conductivity and microwave absorbance. The weight ratio CNT/cellulose can be varied widely, e.g. between 5:95 to 95:5, but a 30:70 to 70:30 weight ratio is preferred. The total CNT content in the final formulation may be 0.1-10% or higher by weight where conductivity increases with increasing CNT content.

Example 4

The following table discloses a useful formulation for an anti-corrosive coating:

| Epoxy Primer Oxide Red | | | |
|---|---|---|---|
| A-component Raw material | Wt % | Density | Volume |
| Bis A/F-Ep resin | 32 | 1.13 | 28.61 |
| MFC-3% | 6 | 1.1 | 5.87 |
| Mix for 5 min Add: | | | |
| Defoamer | 1 | 0.8 | 1.21 |
| Flow additive | 0.5 | 0.97 | 0.45 |
| Mix 2-3 min. Add: | | | |

-continued

| | | | |
|---|---|---|---|
| Red iron oxide | 16 | 5 | 3.23 |
| Fumed silica | 3.5 | 2.2 | 1.47 |
| Plastorit | 8 | 2.9 | 2.79 |
| Grind | | | |
| Bis A/F-Ep resin | 33 | 1.13 | 28.61 |
| Sum | 100 | 1.38 | 72.25 |
| B-component Raw material | Wt % | Density | Volume |
| Polyaminoamide CA | 24 | 1.01 | 71.57 |
| Cycloaliphatic CA | 9 | 0.92 | 30.12 |
| Sum | 33 | 0.98 | 101.69 |

Useful formulations for composites, adhesives and the like follow known art except for 2-10% increased epoxy addition, to compensate for epoxy loss due to reaction with water.

Material properties: as discussed above, it was found that the speed of water removal from epoxy/nano-cellulose is important to minimize the epoxy-to-diol loss reaction. In fact, simple overnight removal of water in an oven converts an estimated 50% of epoxy to diol, finally resulting in a composite with reduced impact strength compared to a formulation not containing any nano-cellulose. Wiped film evaporation reduces the loss reaction to about 10% or less, depending on the combination of temperature and vacuum. For such formulations, impact strength was increased by 10% and more even without further optimisation by e.g. adjusting the epoxy concentration to match the hardener concentration. The same trend is observed for adhesion, cohesive strength, tensile strength and other mechanical properties.

The invention claimed is:
1. A method for producing a thermoset, the thermoset comprising: 1) an epoxy or a polyurethane; and 2) 0.1-10% by weight nano-cellulose, the method comprising the following steps:
   a) providing nano-cellulose as a water-borne dispersion optionally containing up to 50% by weight ethanol, wherein the water-borne dispersion comprises at least 0.2% by weight of the nano-cellulose,
   b) mixing intensively the nano-cellulose with an organic phase comprising at least one epoxy precursor selected from the group consisting of epoxy resin and epoxy hardener, or a polyurethane precursor being a polyol,
   c) removing water and the optional ethanol by distillation at a temperature below 100° C. upon transfer of the nano-cellulose to the organic phase to obtain a dry organic phase, thereby minimizing loss of reactive functionality of the epoxy or the polyurethane,
   d) mixing the dry organic phase with a reactive counterpart and optionally other additives to obtain a mixed product,
      wherein, when the epoxy precursor comprises the epoxy resin, the reactive counterpart is the epoxy hardener,
      wherein, when the epoxy precursor comprises the epoxy hardener, the reactive counterpart is the epoxy resin, and,
      wherein, when the polyurethane precursor comprises the polyol, the reactive counterpart is polyisocyanate, and e) curing the mixed product obtained in step d) to obtain the thermoset, wherein the loss of reactive functionality of the epoxy or the polyurethane due to reaction with water is limited to <50%.

2. The method according to claim 1, wherein the distillation is speed distillation.

3. The method according to claim 1, wherein the distillation uses a rotary evaporator and wiped film evaporator.

4. The method according to claim 1, wherein the distillation uses a rotary evaporator.

5. The method according to claim 1, wherein the distillation uses a wiped film evaporator.

6. The method according to claim 1, wherein the distillation uses an extruder.

7. The method according to claim 1, wherein the nanocellulose is microfibrillar cellulose and/or nanocrystalline cellulose.

8. The method according to claim 1, wherein the nanocellulose is cellulosic fibres obtained by defibering of lignocellulosic raw-material, optionally bleached, with fiber lengths of 10 nanometer up to 100 micrometer, further comprising nanocrystalline cellulose and microfibrillar cellulose.

9. The method according to claim 1, wherein the epoxy is at least one organic compound having at least two epoxy functionalities.

10. The method according to claim 1, wherein the dry organic phase has a residual water content reduced to below 10% by weight by treatment in a rotary evaporator, in a wiped-film-evaporator or in an extruder with possibility for gas removal.

11. The method according claim 1, wherein the thermoset further comprises carbon nano tubes, and the carbon nano tubes being dispersed separately in water and mixed thereafter with the water-borne dispersion, or the carbon nano tubes being dispersed in presence of cellulose, and wherein the carbon nano tubes in the thermoset are present in a range from 0.1% by weight to 10% by weight.

12. The method according to claim 1, wherein the loss of reactive functionality of the epoxy or the polyurethane due to reaction with water is compensated by adjusting a hardener reaction during curing, or by adding additional epoxy hardener to the epoxy or additional polyisocyanate to the polyol to ensure complete cross-linking.

* * * * *